US012108389B2

(12) United States Patent
Ling et al.

(10) Patent No.: US 12,108,389 B2
(45) Date of Patent: Oct. 1, 2024

(54) APPARATUS AND METHOD OF SCHEDULING REQUEST TRANSMISSION AND RECEPTION

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 369 days.

(21) Appl. No.: 17/603,605

(22) PCT Filed: Jun. 26, 2019

(86) PCT No.: PCT/CN2019/093072
§ 371 (c)(1),
(2) Date: Oct. 14, 2021

(87) PCT Pub. No.: WO2020/220454
PCT Pub. Date: Nov. 5, 2020

(65) Prior Publication Data
US 2022/0104228 A1 Mar. 31, 2022

(30) Foreign Application Priority Data
Apr. 30, 2019 (WO) ................ PCT/CN2019/085167

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/0466* (2013.01); *H04W 72/21* (2023.01)

(58) Field of Classification Search
CPC ............. H04W 72/1268; H04W 72/21; H04W 72/0466; H04L 1/1812
(Continued)

(56) References Cited

U.S. PATENT DOCUMENTS 10,939,470 B2 * 3/2021 Hosseini ................ H04L 1/1861
11,627,594 B2 * 4/2023 Gao ....................... H04W 72/21
370/329
(Continued)

FOREIGN PATENT DOCUMENTS

CN        106664520 A     5/2017
EP         3471489 A1     4/2019
(Continued)

OTHER PUBLICATIONS

International Searching Authority, "Written Opinion of the International Searching Authority," PCT/CN2019/093072, Jan. 20, 2020, pp. 1-4.
(Continued)

*Primary Examiner* — Mong-Thuy T Tran
(74) *Attorney, Agent, or Firm* — Kunzler Bean & Adamson

(57) ABSTRACT

Apparatus and methods of scheduling request (SR) transmission and reception in multiple transmit receive points (TRPs) are disclosed. The apparatus includes: a transmitter; and a processor that determines a scheduling request uplink control channel resource configured by higher layer for transmitting a scheduling request in a time interval; wherein the processor further determines a first uplink control information for transmission in a first uplink control channel resource associated with a first identity in the same time interval; the processor further determines whether there is a second uplink control information in a second uplink control channel resource for transmission associated with a second
(Continued)

identity in the same time interval; and the processor controls the transmitter to transmit, in the same time interval, one or a combination selected from: the first uplink control channel resource, the scheduling request uplink control channel resource, and the second uplink control channel resource.

15 Claims, 6 Drawing Sheets

(51) Int. Cl.
    *H04W 72/044*     (2023.01)
    *H04W 72/21*     (2023.01)
(58) Field of Classification Search
    USPC ......................................................... 370/329
    See application file for complete search history.

(56) References Cited

U.S. PATENT DOCUMENTS

| | | | | |
|---|---|---|---|---|
| 11,903,018 | B2* | 2/2024 | Choi | H04W 72/566 |
| 2017/0238304 | A1* | 8/2017 | Ling | H04W 72/21 |
| | | | | 370/336 |
| 2018/0077718 | A1* | 3/2018 | Nory | H04L 5/14 |
| 2020/0178286 | A1* | 6/2020 | Yu | H04L 5/0094 |
| 2020/0314858 | A1* | 10/2020 | Xu | H04W 72/21 |
| 2021/0195623 | A1* | 6/2021 | Xu | H04W 72/569 |

FOREIGN PATENT DOCUMENTS

| | | | |
|---|---|---|---|
| WO | WO-2018170916 A1 * | 9/2018 | |
| WO | WO-2018232368 A1 * | 12/2018 | ........... H04L 1/1812 |

OTHER PUBLICATIONS

Intel Corporation, PUCCH-PUCCH collision handing, 3GPP TSG RAN WG1 Meeting #92, R1-1802410, Feb. 26-Mar. 2, 2018, pp. 1-6, Athens, Greece.

CATT, On multiplexing of different UCI transmissions, 3GPP TSG RAN WG1 Meeting #92bis, R1-1803754, Apr. 16-20, 2018, pp. 1-8, Sanya, China.

* cited by examiner

APPARATUS AND METHOD OF SCHEDULING REQUEST TRANSMISSION AND RECEPTION

CROSS-REFERENCE TO RELATED APPLICATION

This application claims priority from International Patent Application No. PCT/CN2019/085167, filed on 30 Apr. 2019, which is incorporated herein by reference in its entirety for all purposes.

FIELD

The subject matter disclosed herein relates generally to wireless communication, and more particularly relates to, but not limited to, apparatus and methods of scheduling request (SR) transmission and reception in multiple transmit receive points (TRPs).

BACKGROUND

The following abbreviations and acronyms are herewith defined, at least some of which are referred to within the following description.

Third Generation Partnership Project ("3GPP"), 5th Generation ("5G"), New Radio ("NR"), 5G Node B ("gNB"), Long Term Evolution ("LTE"), LTE Advanced ("LTE-A"), Evolved Node B ("eNB"), Universal Mobile Telecommunications System ("UNITS"), Worldwide Interoperability for Microwave Access ("WiMAX"), Evolved UNITS Terrestrial Radio Access Network ("E-UTRAN"), Wireless Local Area Networking ("WLAN"), Orthogonal Frequency Division Multiplexing ("OFDM"), Single-Carrier Frequency-Division Multiple Access ("SC-FDMA"), Downlink ("DL"), Uplink ("UL"), User Entity/Equipment ("UE"), Network Equipment ("NE"), millimeter Wave ("mmWave"), Frequency Range ("FR"), Hybrid Automatic Repeat Request ("HARQ"), Acknowledgement ("ACK"), Hybrid Automatic Repeat Request Acknowledgement ("HARQ-ACK"), Hybrid Automatic Repeat Request Negative Acknowledgement ("HARQ-NACK"), Radio Access Technology ("RAT"), Negative Acknowledgement ("NACK"), Receive ("RX"), Transmit ("TX"), Downlink Control Information ("DCI"), Physical Downlink Control Channel ("PDCCH"), Very-large-scale Integration ("VLSI"), Frequency Division Multiple Access ("FDMA"), Multiple-Input Multiple-Output ("MIMO"), Multi-User MIMO ("MU-MIMO"), Physical Uplink Control Channel ("PUCCH"), Channel State Information Reference Signal ("CSI-RS"), control-resource set ("CORESET"), Uplink Control Information ("UCI"), Transmit Receive Points ("TRP"), Transport Block ("TB"), Physical Uplink Shared Channel ("PUSCH"), Scheduling Request ("SR"), Channel State Information ("CSI"), Time-Division Multiplexing ("TDM"). As used herein, "HARQ-ACK" may represent collectively the Positive Acknowledge ("ACK") and the Negative Acknowledge ("NAK"). ACK means that a TB is correctly received while NAK means a TB is erroneously received.

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations, and a base station may perform wireless communication with UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 Ghz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied in NR Release 16, while a TRP is an apparatus to transmit and receive signals which is controlled by a gNB through the backhaul between the gNB and the TRP. For TRPs with non-ideal backhaul, Uplink Control Information (UCI) corresponding to different TRPs may be separately transmitted to the different TRPs. Each TRP may also have its PUCCH resource group to transmit its own UCI.

Scheduling request (SR) is a special physical layer message used by a UE to ask a network, or gNB for NR, to send a UL transmission grant so that the UE can transmit physical uplink shared channel (PUSCH). The SR is configured with a set of PUCCH resources by a high layer. Each SR transmission in a PUCCH resource is transmitted to one TRP associated with the PUCCH resource. However, it does not matter to which TRP the SR is transmitted, unlike other UCI.

In the case that a SR transmitted in a PUCCH resource associated with a TRP is overlapped with a PUCCH resource carrying HARQ-ACK information and/or CSI for another TRP, one of the resources needs to be dropped, considering the TDM'ed PUCCH transmission within a slot for multiple TRPs with non-ideal backhaul. A systematic solution to this type of problems is desirable.

SUMMARY

According to a first aspect, there is provided an apparatus comprising: a transmitter; and a processor that determines a scheduling request uplink control channel resource configured by higher layer for transmitting a scheduling request in a time interval; wherein the processor further determines a first uplink control information for transmission in a first uplink control channel resource associated with a first identity in the same time interval; the processor further determines whether there is a second uplink control information in a second uplink control channel resource for transmission associated with a second identity in the same time interval; and the processor controls the transmitter to transmit, in the same time interval, one or a combination selected from: the first uplink control channel resource, the scheduling request uplink control channel resource, and the second uplink control channel resource.

According to a second aspect, there is provided an apparatus comprising: a receiver that receives an uplink control channel resource carrying an uplink control information in a time interval; and a processor that determines whether a scheduling request is expected to be transmitted by a remote device in the same time interval; wherein, the processor, upon determination that the scheduling request is expected, decodes the uplink control channel resource to obtain information of the scheduling request.

According to a third aspect, there is provided a method comprising: determining a scheduling request uplink control channel resource configured by higher layer for transmitting a scheduling request in a time interval; determining a first uplink control information for transmission in a first uplink control channel resource associated with a first identity in the same time interval; determining whether there is a second uplink control information in a second uplink control channel resource for transmission associated with a second identity in the same time interval; and controlling a transmitter to transmit, in the same time interval, one or a combination selected from: the first uplink control channel resource, the scheduling request uplink control channel resource, and the second uplink control channel resource.

According to a fourth aspect, there is provided a method comprising: receiving an uplink control channel resource carrying an uplink control information in a time interval; determining whether a scheduling request is expected to be transmitted by a remote device in the same time interval; and upon determination that the scheduling request is expected, decoding the uplink control channel resource to obtain information of the scheduling request.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
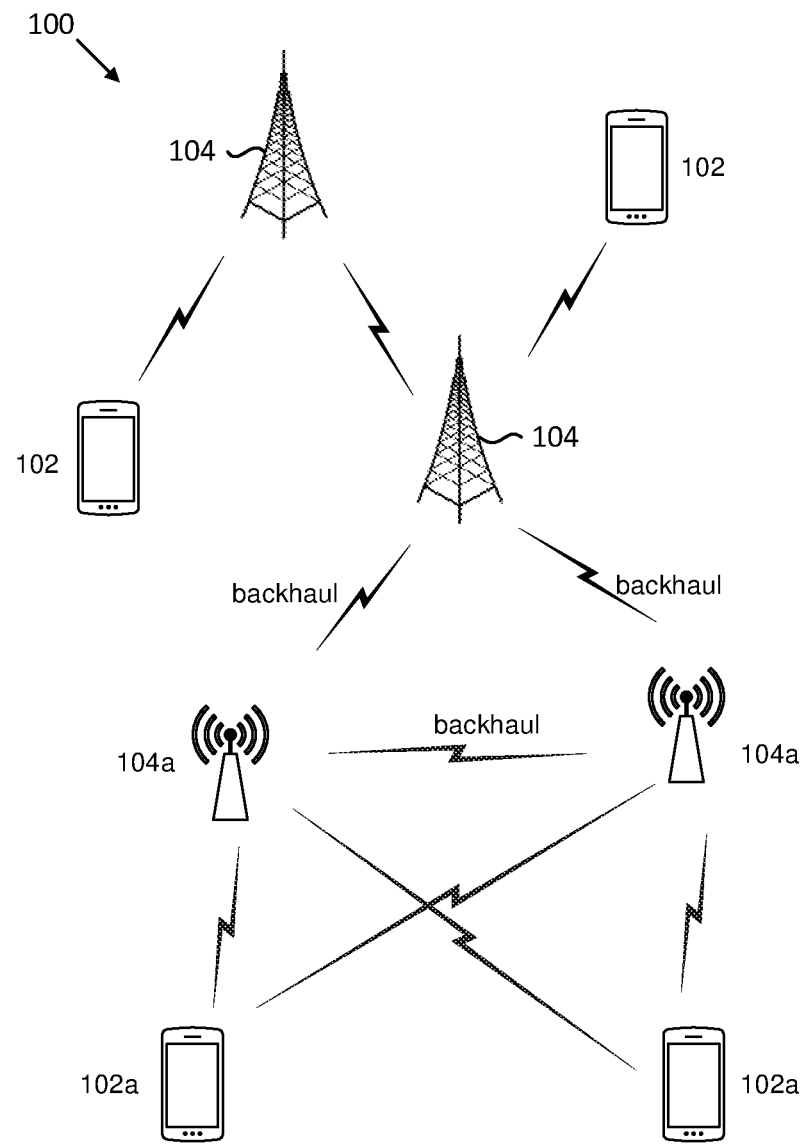
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100. In one embodiment, the wireless communication system 100 may include user equipment (UE) 102 and network equipment (NE) 104.

Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NEs 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced types of the network equipment 104, such as eNB and gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

The NE 104 may also include one or more transmit receive points (TRPs) 104a. In some embodiments, the network equipment may be a gNB 104 that controls a number of TRPs 104a. A TRP is controlled by a gNB through the backhaul between the gNB and the TRP. In addition, there is a backhaul between two TRPs 104a. In some other embodiments, the network equipment may be a TRP 104a that is controlled by a gNB.

Direct or indirect communication link between two or more NEs 104 may be provided.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more transmit receive points (TRPs) that utilize a non-ideal backhaul, simultaneously. A TRP may be a transmission point of a gNB. Multiple beams may be used by the UE and/or TRP(s). The two or more TRPs may be TRPs of different gNBs, or a same gNB. A PUCCH resource group/pool composed of multiple PUCCH resources may be associated with each TRP. Each TRP may be associated with a group of control-resource set (CORESET) IDs. A CORESET is time-frequency resource when PDCCH is transmitted. Therefore, each TRP may be associated with a CORESET group.

Figure 2:
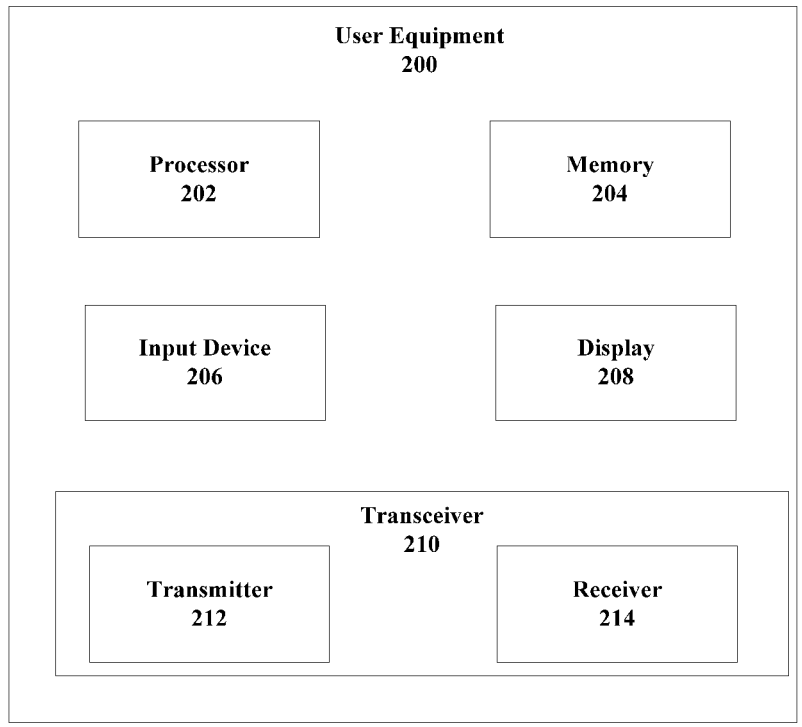
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, each the transmitter 212 and the receiver 214 pair configured to communicate on a different wireless network and/or radio frequency band from another transmitter 212 and receiver 214 pair.

Figure 3:
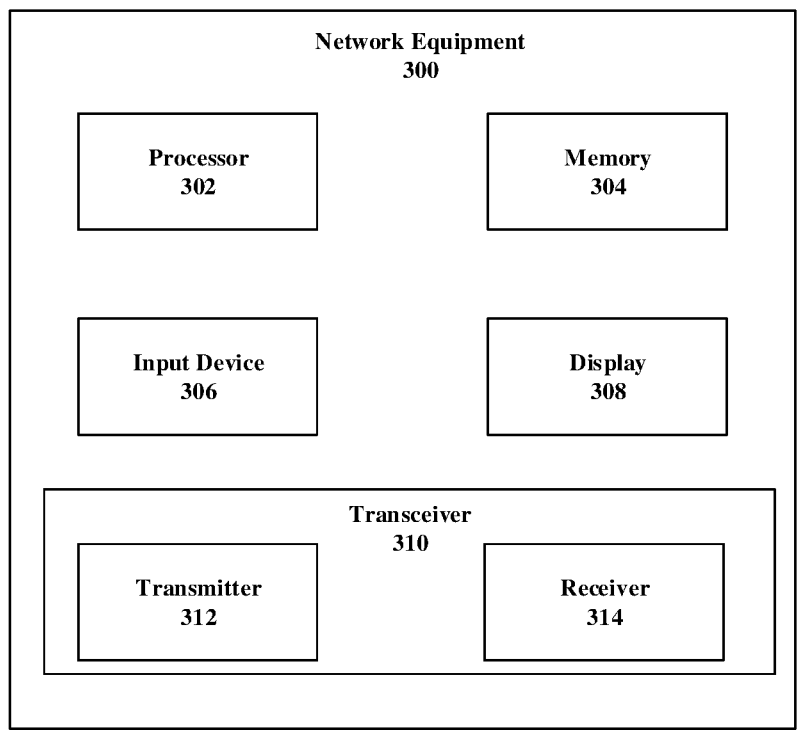
FIG. 3 is a schematic block diagram illustrating components of network equipment (NE) according to one embodiment.

FIG. 3 is a schematic block diagram illustrating components of network equipment (NE) according to one embodiment. The network equipment (NE) 300 may be an exemplary implementation of the NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to the UE 200. The processor 302 may also control the transceiver 310 to receive UL signals/data from the UE 200. For example, the processor 302 may control the transceiver 310 to receive a HARQ-ACK including feedbacks for one or more DL transmissions. In another example, the processor 302 may control the transceiver 310 to transmit DL signals for various configurations to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200. For example, the receiver 314 may receive a HARQ-ACK codebook from the UE 200. As another example, the transmitter 312 may transmit the various configurations/data of the NE 300.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

In the case when a SR, to be transmitted in a PUCCH resource associated with a TRP, is overlapped with another PUCCH resource carrying HARQ-ACK information and/or CSI for another TRP, it is reasonable for the SR to be multiplexed on another PUCCH resource associated with the another TRP, since it does not matter to which TRP the SR is transmitted. In some embodiments, a method of implementing SR multiplexing for multiple TRPs with non-ideal backhaul is disclosed.

The term "overlap" here may refer to the fact that the two PUCCH resources occupy at least one same slot or symbol, i.e. an overlap in the time space or a time conflict. In some embodiments, it does not matter whether there is any overlap in the frequency space.

In this disclosure, two TRPs are used, for example to represent of a multiple TRP system. Systems with more than two TRPs may be implemented using the disclosed principles with necessary adaptations.

According to specification TS 38.213 of NR Release 15, PUCCH resource formats for UCI transmission, SR transmission and multiplex scheme are agreed as follows. If a UE is not transmitting a PUSCH and the UE is transmitting UCI, the UE transmits UCI in a PUCCH using:
  PUCCH format 0 if
    the transmission is over 1 symbol or 2 symbols,
    the number of HARQ-ACK information bits with positive or negative SR (HARQ-ACK/SR bits) is 1 or 2;
  PUCCH format 1 if
    the transmission is over 4 or more symbols,
    the number of HARQ-ACK/SR bits is 1 or 2;
  PUCCH format 2 if
    the transmission is over 1 symbol or 2 symbols,
    the number of UCI bits is more than 2;
  PUCCH format 3 if
    the transmission is over 4 or more symbols,
    the number of UCI bits is more than 2,
    the PUCCH resource does not include an orthogonal cover code;
  PUCCH format 4 if
    the transmission is over 4 or more symbols,
    the number of UCI bits is more than 2,
    the PUCCH resource includes an orthogonal cover code.

A spatial setting for a PUCCH transmission is provided by higher layer parameter *PUCCH-SpatialRelationInfo* if the UE is configured with a single value for higher layer parameter *pucch-SpatialRelationInfoId*; otherwise, if the UE is provided with multiple values for higher layer parameter *PUCCH-SpatialRelationInfo*, the UE determines a spatial setting for the PUCCH transmission.

In some embodiments, a set of PUCCH resources is configured for SR, and each PUCCH resource in the configured PUCCH resources is only associated with one out of two TRPs. Each TRP is configured with multiple CORESETs where a CORESET is a time-frequency region where PDCCH is transmitted, and each CORESET can only be configured to one TRP. Therefore, a TRP can be identified by a CORESET group. For example, in NR Release 16, multiple TRPs is supported, and thus one TRP may be configured with multiple CORESETs, while each CORESET may only be configured for one TRP. Therefore, all the CORESETs configured for one TRP may be grouped as a CORESET group, which may be used to distinguish one TRP from another.

Since the PUCCH resource for SR transmission is configured by a high layer, the configuration of SR therefore known to both TRPs, that is, each TRPs knows in which time interval, or slot in NR, it may receive a SR transmission.

For example, a SR transmission may be carried in a PUCCH resource associated with one TRP (e.g. the first TRP) in one time interval. In this time interval, there may be other UCIs including HARQ-ACK and/or CSI that should be transmitted to the first TRP, and there may also be some UCIs including HARQ-ACK and/or CSI that should be transmitted to the second TRP. The SR may be multiplexed with the UCIs for the first TRP or multiplexed with the UCIs for the second TRP.

If there is a UCI that needs to be transmitted to the first TRP, the UE will determine a PUCCH resource to transmit the UCI without SR for the first TRP; and if there is a UCI that needs to be transmitted to the second TRP, the UE will determine another PUCCH resource to transmit the UCI without SR for the second TRP.

The UE may determine the PUCCH resource carrying UCI for one TRP based on the NR Release 15 scheme—according to DCI indication, if there is HARQ-ACK in the UCI, or according to CSI report configuration and CSI priority if there is no HARQ-ACK in the UCI.

Then, the UE will determine which PUCCH resources and UCIs should actually be transmitted. If the two PUCCH resources are not overlapped, the UE will reserve the two PUCCH resources for further SR multiplexing. If the two PUCCH resources are overlapped, the UE will drop one PUCCH resource with low priority, or with insufficient capacity, or determine two new PUCCH resources, which are not overlapped, by a resource reselection scheme. One example of a resource reselection scheme, also known as PUCCH resource selection scheme, is disclosed in an earlier International Patent Application No. PCT/CN2019/085167 of the inventor, which is incorporated herein by reference in its entirety. Other resource reselection schemes may also be used to provide two non-overlapping PUCCH resources. In some embodiments, the two non-overlapping PUCCH resources may include one existing PUCCH resource and one new PUCCH resource. In some other embodiments, each of the two non-overlapping PUCCH resources may be a new PUCCH resource.

Once two non-overlapping PUCCH resources are provided, these two resources may be treated as the first and second PUCCH resources in the determination of resources for SR transmission. The UE may determine one PUCCH resource to transmit UCI for one TRP only, or two TDM'ed PUCCH resources to transmit UCIs for both TRPs.

Figure 4:
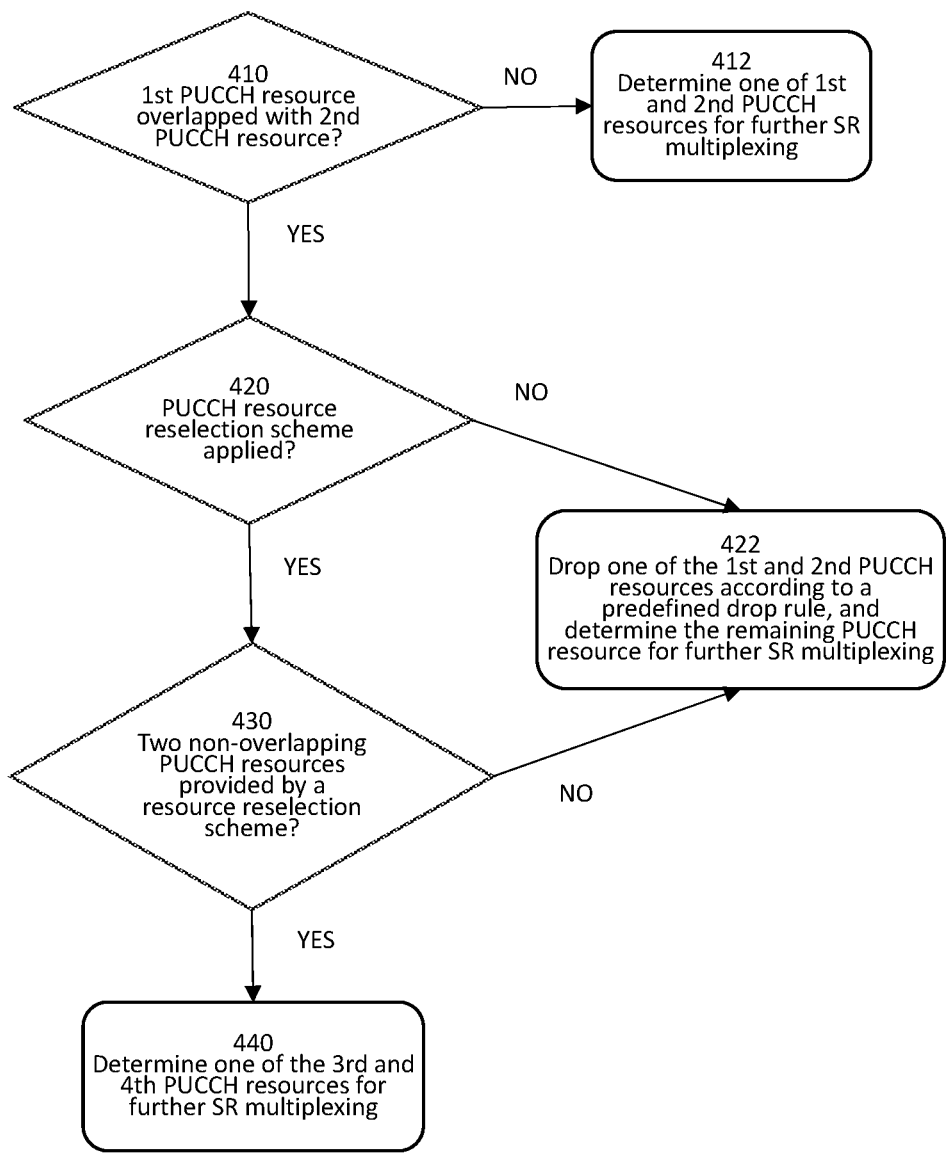
FIG. 4 is a schematic flow diagram of a PUCCH resource determination procedure according to one embodiment.

FIG. 4 is a schematic flow diagram of a PUCCH resource determination procedure according to an embodiment; and it shows an example of how to determine PUCCH resource(s) for further SR multiplexing. In one example, there is a PUCCH resource configured for SR transmission, i.e. a SR PUCCH resource, configured by higher layer for transmitting a scheduling request in a time interval. The SR PUCCH resource may be associated with a first or a second TRP. The first PUCCH resource is the PUCCH resource indicated in DCI or configured in high layer to transmit UCI without SR for the first TRP in the same interval, and the second PUCCH resource is the PUCCH resource indicated in DCI or configured in high layer to transmit UCI without SR for the second TRP in the same interval. Namely, the first PUCCH resource is for transmission of a first UCI to a first TRP, and the second PUCCH resource is for transmission of a second UCI to a second TRP. The PUCCH resources may be indicated in DCI or configured in high layer.

A resource reselection scheme may be applied to obtain two additional PUCCH resources, namely a third PUCCH resource and a fourth PUCCH resource. In one embodiment, the third PUCCH resource may be associated with the first TRP while the fourth PUCCH resource may be associated with the second TRP. That is, the third PUCCH resource and the fourth PUCCH resource are the TDM'ed PUCCH resources transmitting for the first TRP and the second TRP respectively by the PUCCH resource reselection scheme when there is overlapping between the first PUCCH resource and the second PUCCH resource.

It should be noted that the UCI carried in the third PUCCH resource may be the same as or different from the UCI carried in the first PUCCH resource, and the UCI carried in the fourth PUCCH resource may be the same as or different from the UCI carried in the second PUCCH resource according to the PUCCH resource reselection scheme. In addition, the first PUCCH resource and the third PUCCH resource may be the same or different resources, and the second PUCCH resource and the fourth PUCCH resource may be the same or different resources too.

As shown in FIG. 4, in one example, the UE first determines at step 410 whether the first PUCCH resource is overlapped with the second PUCCH resource. When it is determined that they are not overlapped, the UE determines or selects one PUCCH resource from the first and second PUCCH resources for further SR multiplexing.

When it is determined that they are overlapped, the UE may optionally determine at step 420 if a PUCCH resource reselection scheme was applied. If the PUCCH resource reselection scheme was applied, the UE will further determine at step 430 whether two non-overlapping PUCCH resources are provided by the resource reselection scheme.

If the PUCCH resource reselection scheme is not applied, or if the PUCCH resource reselection scheme does not provide two non-overlapping PUCCH resources, the UE may drop at step 422 one of the first and second PUCCH resources according to a predefined drop rule and determine the remaining PUCCH resource for further SR multiplexing.

If, at step 430, it was determined that two non-overlapping PUCCH resources were provided by the resource reselection scheme, the UE determines or selects one of the third and fourth PUCCH resources for further SR multiplexing at step 440.

In some embodiments, the apparatus 200, or the UE 200, includes the transmitter 212; and the processer 202 used to determine a SR uplink control channel resource, or SR PUCCH resource namely a PUCCH resource configured for SR transmission, which may be configured by a higher layer for transmitting a SR in a time interval, or slot in NR, as well as a first UCI for transmission in a first uplink control channel resource, or first PUCCH resource, associated with a first identity, e.g. the first TRP in this case, in the same time interval. A second UCI in a second uplink control channel resource, or second PUCCH resource, may or may not be configured for transmission associated with a second identity, e.g. the second TRP, in the same time interval. One or a combination selected from: the first PUCCH resource, the SR PUCCH resource, and the second PUCCH resource, may be transmitted in different cases. The first identity is associated with a first control resource set (CORESET) group, and the second identity is associated with a second CORESET group. Three different possible cases are disclosed as follows.

Case 1:

After the PUCCH resource determination procedure, there is only one PUCCH resource, or the first PUCCH resource, carrying UCI without SR for the TRP, i.e. the same TRP with which the PUCCH resource configured for SR transmission is associated. Namely, UE determines that there is no second UCI in the second uplink control channel resource for transmission associated with the second identity, or TRP, in the same time interval. And it further determines whether the SR PUCCH resource is associated with the first identity or the second identity.

In this case, the SR PUCCH resource and the first PUCCH resource are associated with a common TRP. This common TRP may be either the first or the second TRP. Here, it is assumed to be the first TRP for convenience. The UE determines that the SR PUCCH resource is associated with the first identity, or the first TRP. The UE will multiplex the SR in the PUCCH resource carrying UCI without SR for the first TRP if the PUCCH resource configured for SR transmission, i.e. the SR PUCCH resource, is overlapped with the PUCCH resource carrying UCI without SR, i.e. the first PUCCH resource.

Case 2:

After the PUCCH resource determination procedure, beside the PUCCH resource configured for SR transmission, i.e. the SR PUCCH resource, that is associated with the one TRP, named the second TRP, it may be determined that there is only one PUCCH resource, or the first PUCCH resource, carrying UCI without SR for the other TRP that is different from the second TRP.

That is, in this case, the SR PUCCH resource and the only one PUCCH resource that carries UCI without SR (i.e. a first PUCCH resource for convenience) are associated with different TRPs. Here, it is assumed that the SR PUCCH resource is associated with the second TRP, while the first PUCCH resource is associated with the first TRP.

If the SR PUCCH resource is overlapped with the first PUCCH resource, the processor 202 may further determine a format of the first PUCCH resource; and based on determination of the format of the first PUCCH resource, the processor 202 may perform a selected one of: controlling the transmitter to transmit the SR in the first PUCCH resource; and controlling the transmitter to drop the SR and to transmit the first PUCCH resource. For example, if the format of the first PUCCH resource is not format 1, then the SR will be multiplexed with the first PUCCH resource; and if the format of the first PUCCH resource is format 1, then the SR will be dropped.

If the SR PUCCH resource is not overlapped with the first PUCCH resource, the UE separately performs the SR transmission according to the SR configuration and the PUCCH resource transmission carrying UCI. Namely, the processor controls the transmitter to transmit both the SR PUCCH resource and the first PUCCH resource.

Figure 5:
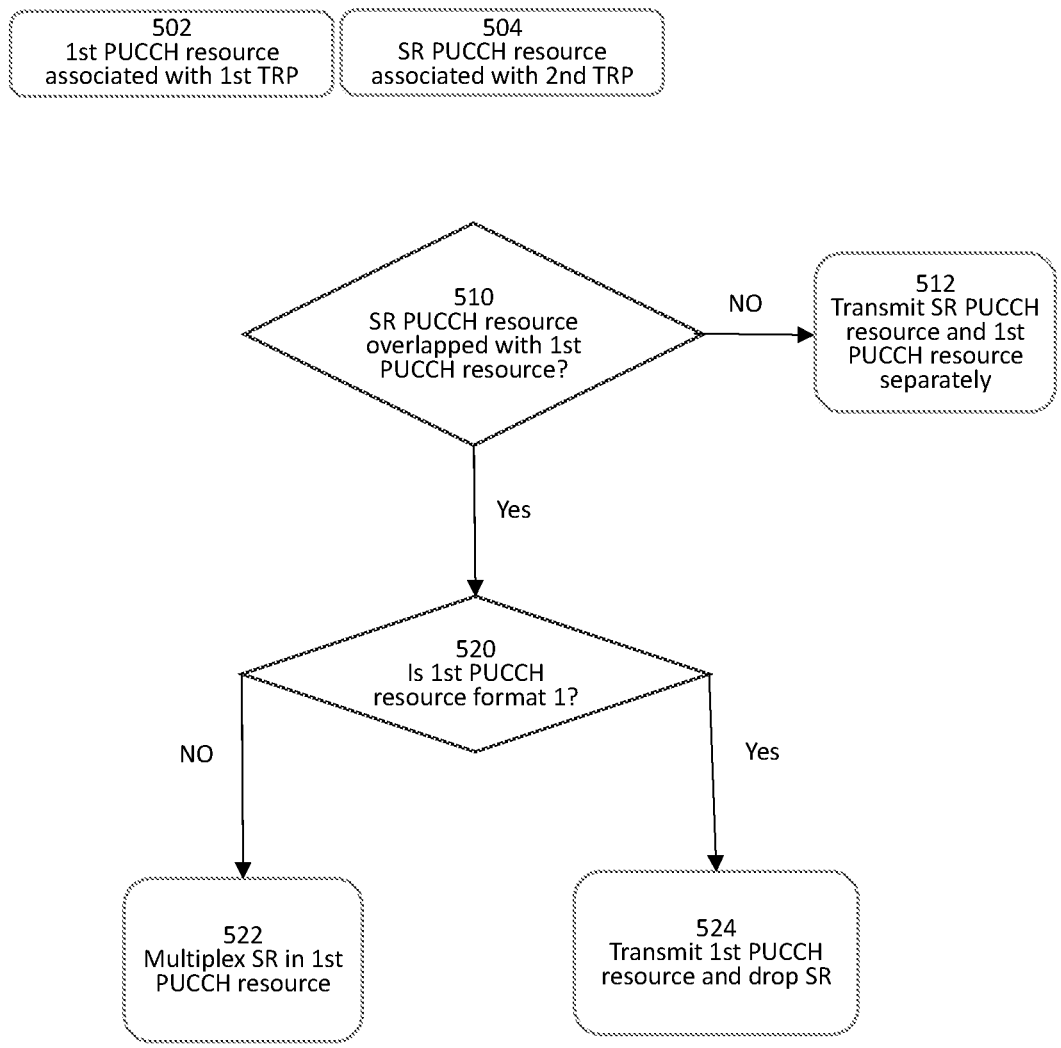
FIG. 5 is a schematic flow diagram of a PUCCH resource determination of one PUCCH resource for SR transmission according to one embodiment.

For example, as shown in FIG. 5, the PUCCH resource configured for SR is SR PUCCH resource 504, which is associated with the second TRP in a time interval, or slot in NR, while a first PUCCH resource 502 carrying UCI for the first TRP should be transmitted in the same slot. First, the UE determines at step 510 whether the two PUCCH resources are overlapped or not. If they are not overlapped, the UE will transmit at step 512 the SR PUCCH resource and the first PUCCH resource separately. In some embodiments, the UE always transmits the first PUCCH resource for the first TRP in slot n. In NR, the SR may have a status of either 'positive' or 'negative'. Positive means that UE has something to transmit in a UL and thus needs a UL scheduling. Negative means the UE has nothing to transmit in UL and thus doesn't need a UL scheduling. According to the SR status (positive or negative), the UE may transmit if the SR status is positive, or may not transmit if the SR status is negative, the SR PUCCH resource for the second TRP. If the two PUCCH resources are overlapped, then UE will further determine at step 520 whether the format of the first PUCCH resource is format 1. The UE will transmit at step 524 the first PUCCH resource and drop the SR if the format of the first PUCCH resource is format 1. Otherwise, the UE will multiplex at step 522 the SR transmission in the first PUCCH resource like the SR multiplex scheme in NR Release 15.

Case 3:

After the PUCCH determination procedure, there are two PUCCH resources carrying UCIs without SR for two TRPs separately, where the two PUCCH resources transmitted for two TRPs are not overlapped.

Figure 6:
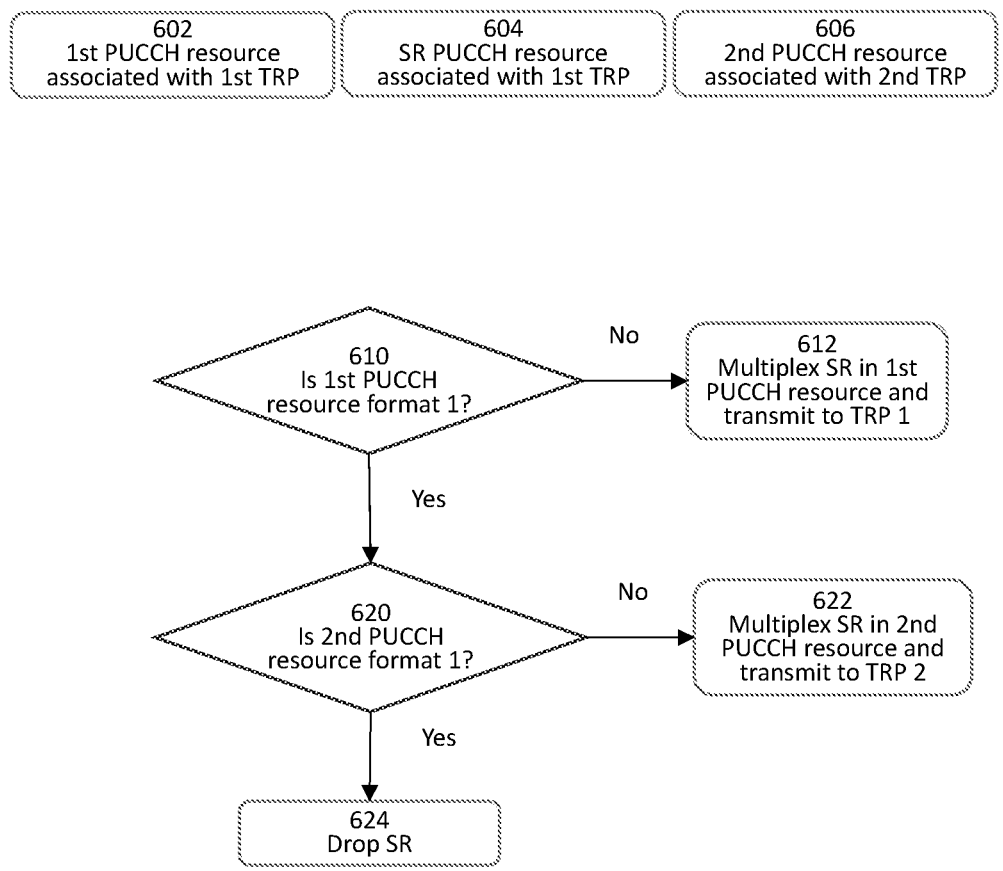
FIG. 6 is a schematic flow diagram of a PUCCH resource determination of two PUCCH resources for SR transmission according to one embodiment.

In one example, as shown in FIG. 6, the PUCCH resource carrying UCI without SR for the first TRP is the first PUCCH resource 602, which is associated with the same TRP as the PUCCH resource configured for SR transmission, i.e. the SR PUCCH resource. The first PUCCH resource 602 may be a resource indicated in a DCI or configured by high layer signaling or the resource by a PUCCH resource reselection scheme as described above. The PUCCH resource carrying UCI without SR for the second TRP is the second PUCCH resource 606, which is associated with the second TRP. Similarly, the second PUCCH resource may be a resource indicated in DCI or configured in high layer or the resource by a PUCCH resource reselection scheme. The PUCCH resource configured for SR is SR PUCCH resource 604, which is associated with the first TRP.

In some embodiments, the UE first determines at step 610 whether the format of the first PUCCH resource is format 1. If it is not format 1, the UE will multiplex at step 612 a SR transmission in the first PUCCH resource similar to the NR Release 15 SR multiplexing scheme. If the format of the first PUCCH resource is format 1, the UE will further determine at step 620 whether the format of the second PUCCH resource is format 1. If the format of the second PUCCH resource is not format 1, the UE will multiplex at step 622 SR transmission in the second PUCCH resource similar to the SR multiplexing scheme in NR Release 15. If the format of the second PUCCH resource is format 1, the UE will drop at step 624 the SR transmission and transmit the first PUCCH resource and the second PUCCH resource.

On the TRP side, since the UE may transmit SR to either one of the first TRP and the second TRP according to the scheme described above, it should ensure the TRPs can blindly decode the received PUCCH resource with or without the SR multiplexed within it.

If the format of the PUCCH resource in which SR is multiplexed is format 0, the TRP can blindly decode the SR since the PUCCH format 0's transmission is based on sequence.

If the format of the PUCCH resource in which SR is multiplexed is format 2, 3 or 4, then a number of ceil(log 2(K+1)) bits representing a negative or positive SR will be transmitted as a part of UCI transmitted in the PUCCH resource, in ascending order of the values of schedulingRequestResourceId if the UE is configured to transmit K PUCCHs for respective K SRs in a time interval, as determined by a set of schedulingRequestResourceId.

If the TRP does not know whether the PUCCH resource with format 2, 3 or 4 includes the ceil(log 2(K+1)) bits transmitted by the UE, then the TRP may not be able to interpret the UCI bits carried in the PUCCH resource to decode the SR. Two possible solutions are proposed to solve this problem.

Solution 1:

All the PUCCH resources of format 2, 3 or 4 may be configured to carry multiplexed SR therein, and the UE will always transmit ceil(log 2(K+1)) bits in the PUCCH resource with format 2, 3 or 4. The UE will transmit a state indicated by all-zero value for the ceil(log 2(K+1)) bits representing a negative SR value across all K SRs in the PUCCH resource if the SR is not multiplexed in the PUCCH resource. For TRP decoding, the TRP always decodes the PUCCH resource with format 2, 3 or 4 assuming that there is SR multiplexed in it.

Solution 2:

All the PUCCH resources with format 2, 3 or 4 may be configured to have a possibility to multiplex SR therein. An implicit indicator may be provided to inform the receiving gNB whether there is SR multiplexing in a PUCCH resource with format 2, 3 or 4. In NR Release 15, the generation of PUCCH format 2, 3 or 4 always needs scrambling, which needs to initialize the scrambling sequence generator by using the equation $$c_{init} = n_{RNTI} \cdot 2^{15} + n_{ID}$$

where $n_{ID} \in \{0, 1, \ldots, 1023\}$ equals the higher-layer parameter dataScramblingIdentityPUSCH if configured, cell $n_{ID} = N_{ID}^{cell}$ otherwise.

In some embodiments, the initialization of the scrambling sequence generator ($c_{init}$) of the PUCCH resource with format 2, 3 or 4 may be dependent on whether there is SR multiplexed in the PUCCH resource. On the UE side, it will determine whether this PUCCH resource multiplexes with SR transmission. If the PUCCH resource multiplexes with SR transmission, the $c_{init}$ will indicate implicitly that there is SR multiplexing in the PUCCH resource, and the PUCCH resource will transmit ceil(log 2(K+1)) bits for SR. Otherwise, the $c_{init}$ will indicate implicitly that there is no SR multiplexing in the PUCCH resource and the PUCCH resource will not transmit ceil(log 2(K+1)) bits for SR.

In some embodiments, the processor 202 determines a format of a PUCCH resource, and upon determination that the format of the PUCCH resource requires scrambling, that is format 2, 3, or 4, the processor 202 controls the transmitter 212 to transmit the PUCCH resource with a preset number of SR information bits.

In some other embodiments, the processor 202 determines a format of a PUCCH resource, and upon determination that the format of the PUCCH resource requires scrambling, that is formats 2, 3, or 4, the processor 202 initializes a scrambling sequence generator of the PUCCH resource indicating whether the SR is transmitted in the PUCCH resource or not.

As an example, to illustrate decoding on the TRP sides, the PUCCH resource configured for SR, i.e. the SR PUCCH, is associated with the first TRP in a time interval. The first TRP will determine whether there is a first UCI without SR to be received in the same time interval. If there is a first UCI transmission for the first TRP in this time interval, the first TRP will detect a first PUCCH resource indicated in DCI or configured in higher layer signaling assuming there is a SR multiplexed in this PUCCH resource if the format of the first PUCCH resource is not format 1. Furthermore, if a resource reselection scheme has been applied by the UE, the first TRP will further detect a second PUCCH resource carrying a second UCI by applying the PUCCH resource reselection scheme if the first TRP does not detect the UCI in the first PUCCH resource successfully. Similarly, the first TRP will detect the second PUCCH resource assuming there is SR multiplexing in the second PUCCH resource if the format of the second PUCCH resource is not format 1. Besides, the first TRP may be also be configured to detect SR transmission in the PUCCH resource configured for SR transmission if the first PUCCH resource is not overlapped with the PUCCH resource configured with the SR transmission, or the format of the first PUCCH resource and the PUCCH resource configured for SR transmission are both format 1.

On the second TRP side, first, it will determine whether a first UCI carrying in a first PUCCH resource should be received in the same time interval with the SR transmission. It will further determine whether the format of the first PUCCH resource indicated in DCI or configured in high layer is format 1 if there is a first UCI to be received. Then, the second TRP will detect the first PUCCH resource assuming a SR is multiplexed in the first PUCCH resource if the format of the first PUCCH resource is not format 1. It will further determine a second PUCCH resource carrying a second UCI by applying the PUCCH resource reselection scheme if the second TRP does not detect the UCI in the first PUCCH resource successfully. Similarly, the second TRP will detect the second PUCCH resource assuming a SR is multiplexed in the second PUCCH resource if the format of the second PUCCH resource is not format 1.

Accordingly, in some embodiments, the apparatus 300, or a TRP in this case, includes the receiver 314 that receives an uplink control channel resource, or PUCCH resource, carrying an uplink control information (UCI) in a time interval, or slot in NR. The apparatus 300 also includes the processor 302 that determines whether a scheduling request (SR) is expected to be transmitted by a remote device 200 in the same time interval. The processor 302, upon determination that the scheduling request is expected, decodes the uplink control channel resource to obtain information of the scheduling request.

Figure 7:
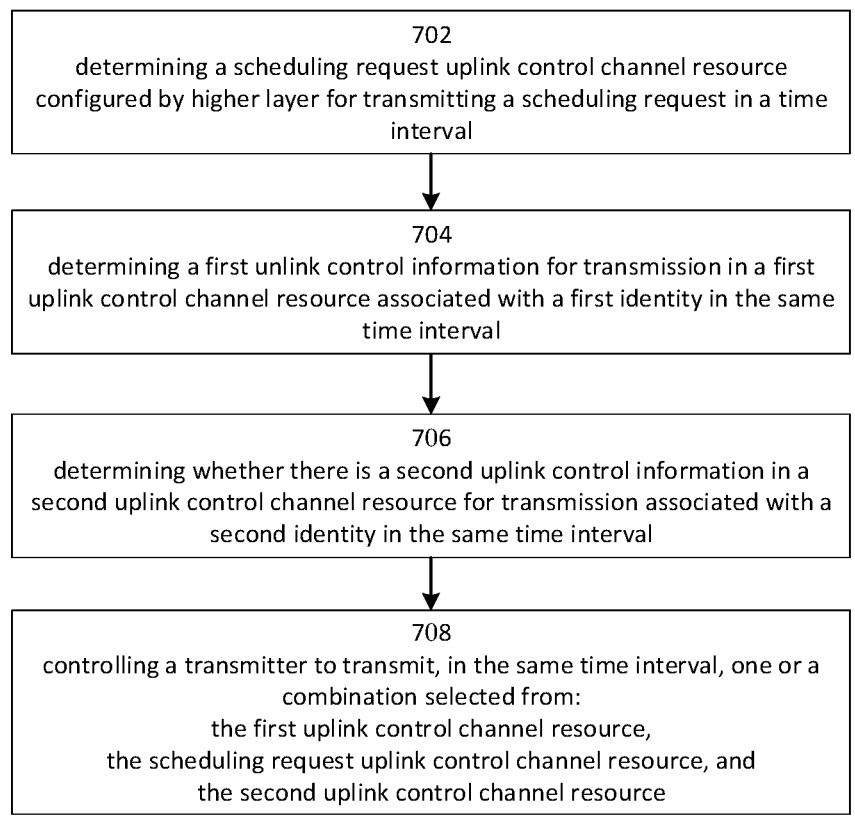
FIG. 7 is a flow chart illustrating steps of a SR transmission according to one embodiment.

FIG. 7 is a flow chart illustrating steps of a SR transmission.

In step 702, the processor 202 determines a scheduling request (SR) uplink control channel (PUCCH) resource configured by higher layer for transmitting a scheduling request in a time interval, or slot in NR.

In step 704, the processor 202 determines a first uplink control information for transmission in a first uplink control channel resource, or the first PUCCH resource, associated with a first identity, or the first TRP, in the same time interval.

In step 706, the processor 202 determines whether there is a second uplink control information in a second uplink control channel resource, or the second PUCCH resource, for transmission associated with a second identity, or the second TRP, in the same time interval.

In step 708, the processor 202 controls a transmitter 212 to transmit, in the same time interval, one or a combination selected from:

the first uplink control channel resource,
the scheduling request uplink control channel resource, and
the second uplink control channel resource.

In some embodiments, when it is determined that there is no second uplink control information in the second PUCCH resource for transmission associated with the second TRP in the same time interval, the processor 202 further determines whether the SR PUCCH resource is associated with the first TRP or the second TRP.

If the SR PUCCH resource is associated with the first TRP, the processor 202 multiplexes the SR with the first PUCCH resource and controls the transmitter 212 to transmit the first PUCCH resource with the SR multiplexed in it.

If the SR PUCCH resource is associated with the second TRP, the processor 202 controls the transmitter 212 to transmit both the SR PUCCH resource and the first PUCCH resource when these two resources are not overlapped; and if the SR PUCCH resource is associated with the second TRP and the SR PUCCH resource and the first PUCCH resource are overlapped, the processor 202 determines a format of the first PUCCH resource and controls the transmitter 212 to either transmit the SR PUCCH resource in the first PUCCH (i.e. multiplexing), or to drop the SR and transmit the first PUCCH resource, based on the determination of the format of the first PUCCH resource.

In some embodiments, when it is determined that there is the second PUCCH resource, the processor 202 determines whether the SR PUCCH resource is associated with the first TRP or the second TRP, and whether the first PUCCH and the second PUCCH are overlapped. If the SR PUCCH resource is associated with the first TRP and no overlap is determined, the processor 202 further determines formats of the first PUCCH resource and the second PUCCH resource, and controls the transmitter 212 to transmit the SR in the first PUCCH resource when the format of the first PUCCH permits it (i.e. not format 1) or to transmit the SR in the second PUCCH resource when the format of the second PUCCH permits it (i.e. not format 1). If the formats of the first PUCCH resource and the second PUCCH resource do not allow SR multiplexing, the processor 202 controls the transmitter 212 to drop the SR, and to transmit the first and second PUCCH resources.

In some embodiments, if the format of the first and/or second PUCCH resource requires scrambling, the processor 202 initializes a scrambling sequence generator of the first and/or second PUCCH resource indicating whether the SR is transmitted in the first and/or second PUCCH resource or not.

In some embodiments, if the format of the first and/or second uplink control channel resource requires scrambling, the processor 202 further controls the transmitter to transmit the first and/or second uplink control channel resource with a preset number of scheduling request information bits.

Figure 8:
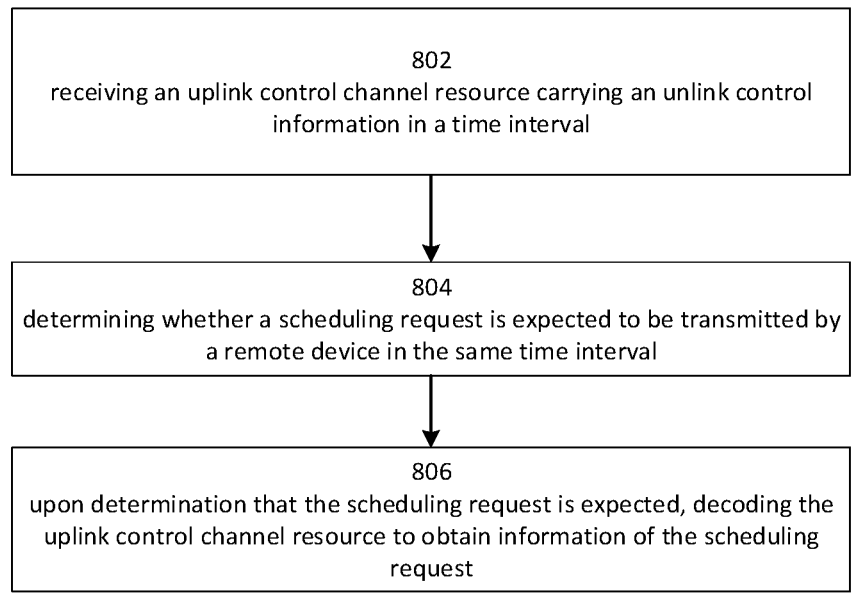
FIG. 8 is a flow chart illustrating steps of a SR reception according to one embodiment.

FIG. 8 is a flow chart illustrating steps of a SR reception.

In step 802, the receiver 314 receives an uplink control channel resource, or PUCCH resource, carrying an uplink control information (UCI) in a time interval, or slot in NR.

In step 804, the processor 302 determines whether a scheduling request (SR) is expected to be transmitted by a remote device 200 in the same time interval.

In step 806, upon determination that the scheduling request is expected, the processor 302 decodes the uplink control channel resource to obtain information of the scheduling request.

In some embodiments, the processor 302 determines that a format of the PUCCH resource requires scrambling. In such case, the processor 302 decodes the PUCCH resource using a first initialization of a scrambling sequence generator indicating that the SR is transmitted in the PUCCH resource.

In some embodiments, the processor 302 decodes the PUCCH resource using a second initialization of the scrambling sequence generator indicating that the SR is not transmitted in the PUCCH resource.

In some embodiments, the processor 302 decodes the PUCCH resource by assuming that the PUCCH resource includes a preset number of SR information bits.

This disclosure provides a method of how to multiplex SR in multiple TRPs, and the SR may be multiplexed with the PUCCH resource targeting for the same TRP, or it may also be multiplexed with PUCCH resource targeting for the different TRP. The SR transmission is not bundled with the TRP with which the PUCCH resource associated to improve the SR transmission opportunity.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
determine a scheduling request uplink control channel resource configured by higher layer for transmitting a scheduling request in a time interval;
determine a first uplink control information for transmission in a first uplink control channel resource associated with a first identity in the same time interval;
determine whether there is a second uplink control information in a second uplink control channel resource for transmission associated with a second identity in the same time interval;
transmit, in the same time interval, one or a combination selected from:
the first uplink control channel resource,
the scheduling request uplink control channel resource, and
the second uplink control channel resource;
upon determination that there is the second uplink control information in the second uplink control channel resource for transmission associated with the second identity in the same time interval, determine whether the scheduling request uplink control channel resource is associated with the first identity or the second identity and determine whether the first uplink control channel resource is overlapped with the second uplink control channel resource; and
upon determination that the first uplink control channel resource is not overlapped with the second uplink control channel resource, and that the scheduling request uplink control channel resource is associated with the first identity, determines a format of the first uplink control channel resource.

2. The UE of claim 1, wherein the first identity is associated with a first control resource set group, and the second identity is associated with a second control resource set group.

3. The UE of claim 1, wherein, upon determination that there is no second uplink control information in the second uplink control channel resource for transmission associated with the second identity in the same time interval, the at least one processor is configured to determine whether the scheduling request uplink control channel resource is associated with the first identity or the second identity.

4. The UE of claim 3, wherein, upon determination that the scheduling request uplink control channel resource is associated with the second identity, and that the scheduling request uplink control channel resource is overlapped with the first uplink control channel resource, the at least one processor is configured to determine a format of the first uplink control channel resource, and, based on determination of the format of the first uplink control channel resource, perform a selected one of:
controlling the transmitter to transmit the scheduling request in the first uplink control channel resource; and
controlling the transmitter to drop the scheduling request and, to transmit the first uplink control channel resource.

5. The UE of claim 1, wherein the at least one processor is configured to determine a format of the first and/or second uplink control channel resource, and, upon determination that the format of the first and/or second uplink control channel resource requires scrambling, the at least one processor is configured to transmit the first and/or second uplink control channel resource with a preset number of scheduling request information bits.

6. The UE of claim 1, wherein the at least one processor is configured to determine a format of the first and/or second uplink control channel resource, and, upon determination that the format of the first and/or second uplink control channel resource requires scrambling, the at least one processor is configured to initialize a scrambling sequence generator of the first and/or second uplink control channel resource indicating whether the scheduling request is transmitted in the first and/or second uplink control channel resource or not.

7. A method performed at a user equipment (UE), the method comprising:
determining a scheduling request uplink control channel resource configured by higher layer for transmitting a scheduling request in a time interval;
determining a first uplink control information for transmission in a first uplink control channel resource associated with a first identity in the same time interval;

determining whether there is a second uplink control information in a second uplink control channel resource for transmission associated with a second identity in the same time interval;

controlling a transmitter to transmit, in the same time interval, one or a combination selected from:
the first uplink control channel resource,
the scheduling request uplink control channel resource, and
the second uplink control channel resource;

upon determination that there is the second uplink control information in the second uplink control channel resource for transmission associated with the second identity in the same time interval, determining whether the scheduling request uplink control channel resource is associated with the first identity or the second identity and determine whether the first uplink control channel resource is overlapped with the second uplink control channel resource; and upon determination that the first uplink control channel resource is not overlapped with the second uplink control channel resource, and that the scheduling request uplink control channel resource is associated with the first identity,
determining a format of the first uplink control channel resource.

8. The method of claim 7, wherein the first identity is associated with a first control resource set group, and the second identity is associated with a second control resource set group.

9. The method of claim 7, further comprising, upon determination that there is no second uplink control information in the second uplink control channel resource for transmission associated with the second identity in the same time interval, determining whether the scheduling request uplink control channel resource is associated with the first identity or the second identity.

10. The method of claim 9, further comprising, upon determination that the scheduling request uplink control channel resource is associated with the second identity, and that the scheduling request uplink control channel resource is overlapped with the first uplink control channel resource, determining a format of the first uplink control channel resource; and, based on determination of the format of the first uplink control channel resource, performing a selected one of:
controlling the transmitter to transmit the scheduling request in the first uplink control channel resource; and
controlling the transmitter to drop the scheduling request and, to transmit the first uplink control channel resource.

11. The method of claim 7, further comprising, upon determination that the format of the first uplink control channel resource is capable of transmitting the scheduling request in the first uplink control channel resource, controlling the transmitter to transmit the scheduling request in the first uplink control channel resource.

12. The method of claim 7, further comprising, upon determination that the format of the first uplink control channel resource is not capable of transmitting the scheduling request in the first uplink control channel resource, determining a format of the second uplink control channel resource.

13. The method of claim 12, further comprising, upon determination that the format of the second uplink control channel resource is capable of transmitting the scheduling request in the second uplink control channel resource, controlling the transmitter to transmit the scheduling request in the second uplink control channel resource.

14. The method of claim 7, further comprising determining a format of the first and/or second uplink control channel resource, and, upon determination that the format of the first and/or second uplink control channel resource requires scrambling, controlling the transmitter to transmit the first and/or second uplink control channel resource with a preset number of scheduling request information bits.

15. The method of claim 7, further comprising determining a format of the first and/or second uplink control channel resource, and, upon determination that the format of the first and/or second uplink control channel resource requires scrambling, initializing a scrambling sequence generator of the first and/or second uplink control channel resource indicating whether the scheduling request is transmitted in the first and/or second uplink control channel resource or not.

* * * * *